United States Patent [19]

Nakhmanson

[11] Patent Number: 5,004,409
[45] Date of Patent: Apr. 2, 1991

[54] DISPLACEMENT MACHINE

[76] Inventor: Raoul S. Nakhmanson, Sauerbruchstrasse 49, D-6204 Taunusstein (Neuhof), Fed. Rep. of Germany

[21] Appl. No.: 327,243

[22] Filed: Mar. 22, 1989

[30] Foreign Application Priority Data

Mar. 22, 1988 [DE] Fed. Rep. of Germany ....... 3809478
Apr. 28, 1988 [DE] Fed. Rep. of Germany ....... 3814311

[51] Int. Cl.$^5$ .............................................. F01C 1/00
[52] U.S. Cl. ..................................... 418/58; 418/107; 418/150; 418/160; 418/209
[58] Field of Search ................... 418/58, 68, 61.1, 107, 418/150, 160, 161, 196, 199, 209, 253, 270; 123/241, 242

[56] References Cited

U.S. PATENT DOCUMENTS 2,139,856  12/1938  Savage ........................... 418/61.1
3,574,494   4/1971  Bellmer .......................... 418/270
4,173,439  11/1979  Hopkins .......................... 418/209

*Primary Examiner*—John J. Vrablik
*Attorney, Agent, or Firm*—Jones, Day, Reavis & Pogue

[57] ABSTRACT

A prime mover or pump comprising of a first stationary plate and a second plate arranged parallel to the stationary plate and spaced therefrom. The second plate is rotatably mounted about its central axis. A plurality of elongated wall elements are disposed between the plates. The wall elements slidably bear on the plates to form a seal therewith such that working chambers are created. Each wall element is articulated at one end point to a further wall element such that the wall elements form a movable grid. The grid is rotatably secured at at least one point to the stationary plate and at at least two points to the rotatable plate such that the working chambers assume their maximum and minimum volumes upon rotation of the rotatably plate.

27 Claims, 8 Drawing Sheets

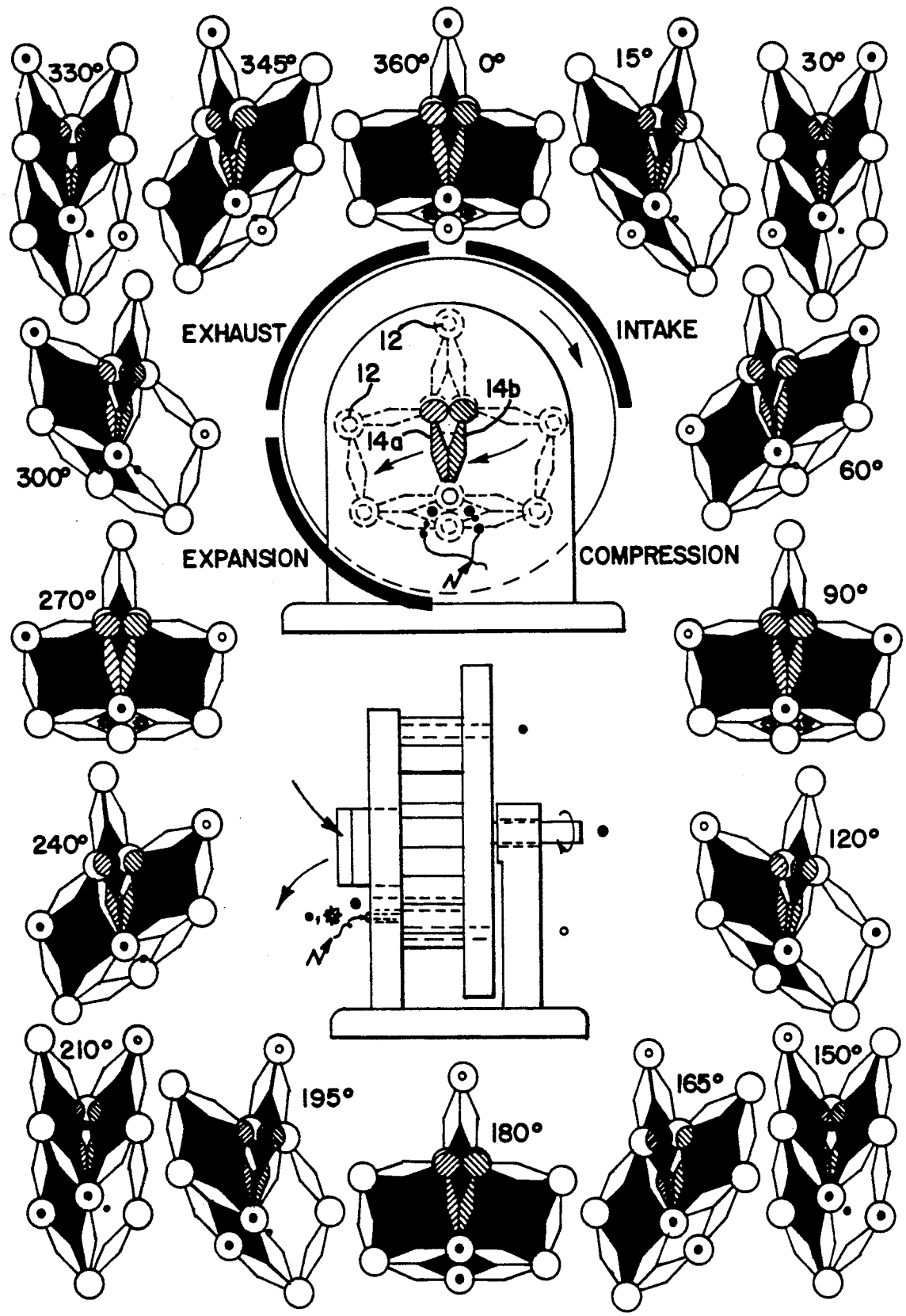

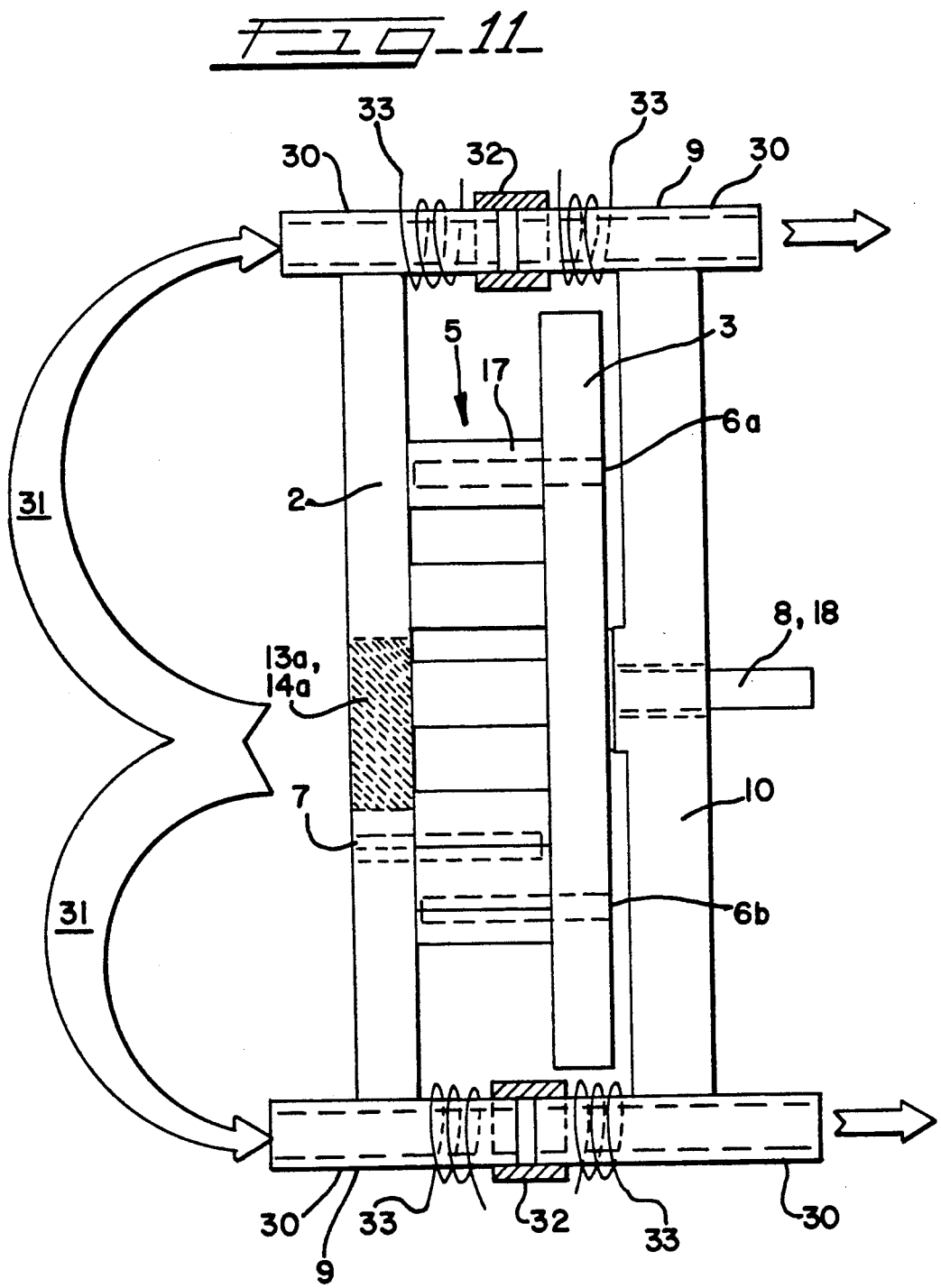

DISPLACEMENT MACHINE

BACKGROUND OF THE INVENTION

The invention relates to a machine comprising at least two working chambers with variable volume volume and at least one inlet opening and one outlet opening for gaseous or liquid media.

The field of use of the machine according to the invention includes the fields of internal-combustion engines, steam engines or machines or pressure-operated engines or machines (by gases or liquids or fluids) and the areas of use of pumps for gaseous and liquid media.

In conventional internal-combustion engines (piston engines) an oscillating movement of the pistons is converted into a rotary movement of the crankshaft. A disadvantage of these internal-combustion engines is the fact that valves, a crankshaft and a camshaft must be present. Since an oscillating movement of parts always involves a retardation and acceleration of masses, which firstly reduces the efficiency and secondly leads to an increased stress of the components of the engine, so-called rotary piston engines were developed which have only rotating parts.

Like the reciprocating piston engines, these rotary piston engines have sealed working chambers with rigid walls, at least one of which is moved in such a manner that a variable volume of the working space results. The variable working space or chamber is formed between the power member (that is, the piston transmitting the power) and the shutoff part not transmitting any power. Rotary piston engines are subdivided into rotational piston, orbiting piston and revolving piston engines.

A disadvantage of rotational piston engines and orbital piston engines is that their mass forces must be compensated externally by counterweights. In a rotational piston engine, because of the rotating shutoff member, the supply of the fresh gas and discharge of the waste gases is difficult. For this reason, of rotary piston engines only the Wankel engine operating on the principle of an orbital piston engine has established itself. However, the major problem in a Wankel engine is the satisfactory sealing of the working chambers. Further disadvantages reside in that only about 6% of the total volume is available as useful volume for the working chambers, that due to the rotation of the Wankel disc the engine is unbalanced, and that for the power transmission a crankshaft and additional gears are likewise necessary.

Further disadvantages in a reciprocating piston engine are that when the engine is operated the heat arising in the pistons must be dissipated via piston rings of small cross-section because the cylinder diameter cannot be adapted when thermal dimensional changes take place.

Also, with respect to sealing in the Wankel engine, first sealing strips are required at the corners of the rotary piston, and second sealing elements are necessary at the side faces of the rotary piston because the spacing of the side walls cannot be varied. In both cases the sealing elements offer large resistance to heat dissipation, and consequently the cooling of the pistons or of the rotor cannot be as effective as is desired.

SUMMARY OF THE INVENTION

The problem addressed by the invention is therefore to provide an engine or machine which when used as an internal-combustion engines does not have the aforementioned disadvantages, and which is distinguished by a simple and compact structure and higher efficiency.

The problem is solved with a machine which is characterized by:

a first stationary plate and a second plate which is arranged parallel to the stationary plate and spaced therefrom, and which is rotatably mounted via its central axis with respect to the stationary plate, a plurality of elongated wall elements which are disposed between said plates and which bear slidingly and sealingly on said plates, and together with said plates form the working chambers, each wall element being articulately sealingly connected at its end points (articulation points) to at least one further wall element in such a manner that said wall elements form a movable grid which is rotatably secured at at least one point to the stationary plate and at at least two points to the rotatable plate in such a manner that upon rotation of the rotatable plate the working chambers alternately assume their minimum and maximum volume, and a shaft mounted in the axis of rotation of the rotatable plate.

DESCRIPTION OF THE DRAWINGS

The machine according to the invention will be explained in detail hereinafter with the aid of the drawings, wherein:

FIG. 10 is an illustration of the various work phases of the combustion-engine cycle.

FIG. 11 is a side view of the machine according to yet a further embodiment.

The machine or engine according to the invention is distinguished by essentially only three different components, i.e. the two plates and the elongated wall elements.

The wall elements have a dumbbell form, and consist of an elongated centre portion on each of the two opposite articulation points of which an articulation portion is integrally formed.

According to a particular embodiment, the wall elements consist of a centre portion which is formed rectangularly in side elevation and rhomboidally in plan elevation. The centre portion may also, however, consist of at least two rhomboidal elements which have different angles. Thus, for example the one rhombiodal element may taper completely pointedly at the articulation portions whilst the other rhomboidal element still has there a certain width and forms the actual connection to the articulation portions or members. The arrangement of said elements in the adjacent wall element is to be adapted thereto so that the freedom of movement of the cooperating wall elements is not restricted.

As will be explained hereinafter with reference to the drawings, the rhomboidal form is necessary so that the wall elements can bear on each other over the greatest possible region when the working chambers assume their minimum volume.

Figure 2:
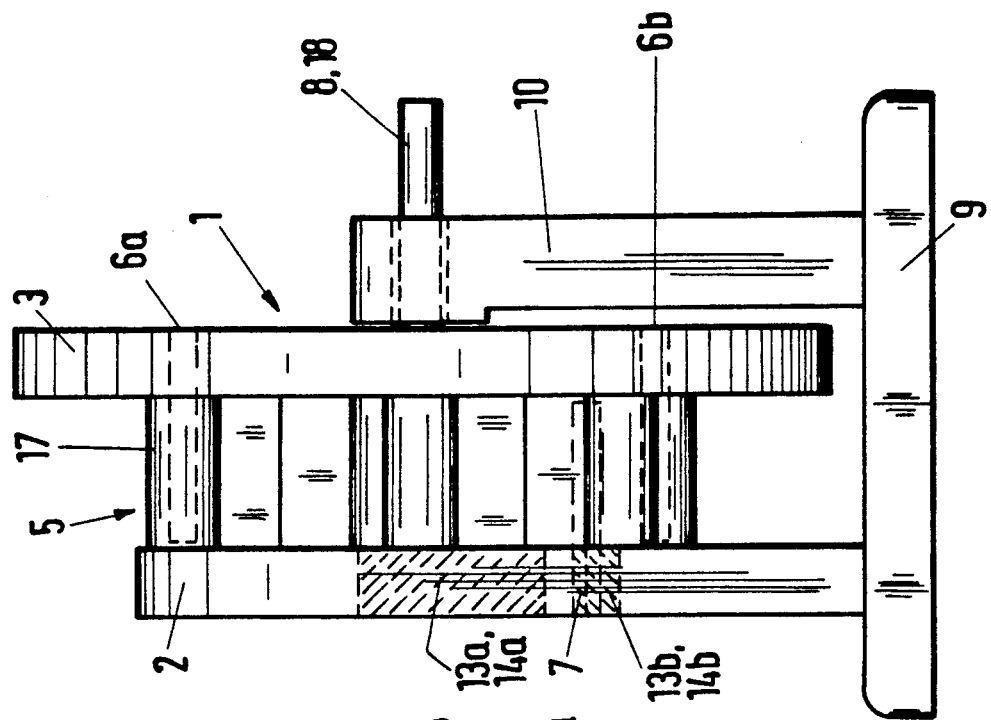
FIG. 2 is a side elevation of the embodiment shown in FIG. 1.
Figure 1:
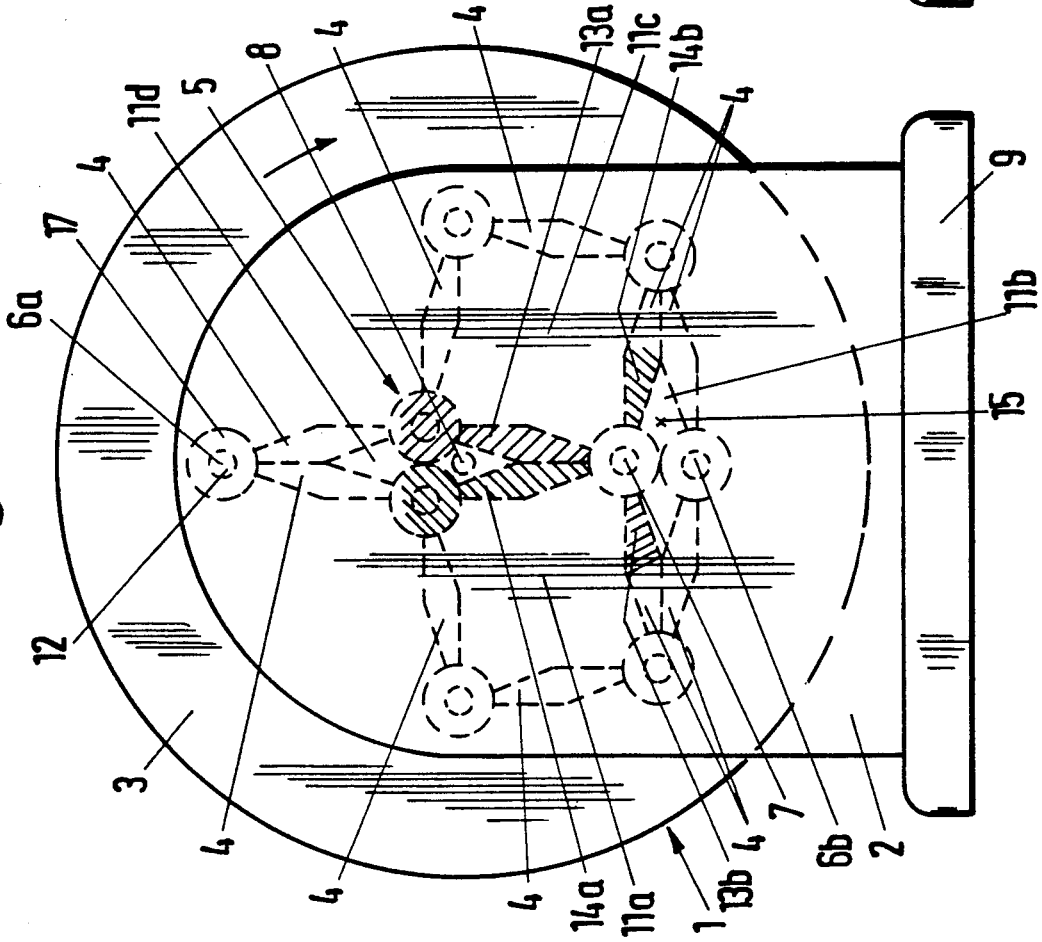
FIG. 1 shows a plan view of the machine according to one embodiment of the invention.

In FIG. 1, the engine or machine 1 according to the invention is shown in plan view. On a base plate 9, a stationary plate 2 and a holder 10 are secured. It is possible to extend the plate 2 and holder 10 upwardly and laterally to provide a stable housing. The plate 3 is mounted rotatably about its axis 8 on the holder 10 (FIG. 2). To said plate 3, the shaft 18 is secured, which depending upon the use is formed as a drive shaft or an output shaft. Between the plates 2 and 3, the grid 5 is disposed, and is made up of a total of twelve wall elements 4.

The grid may, for example, be made up as follows: firstly, four wall elements 4 are interconnected with their respective articulation members or portions 17. Said four wall elements form the inner wall elements of the grid 5. The outer wall elements 4 are connected to the outer articulation portions 17 of said inner wall elements 4 in such a manner that between each pair of outer articulation portions 17 or two inner wall elements 4, two outer wall elements 4 are disposed. The connecting point of the four inner wall elements 4 serves as a securing point 7 for securing the grid 5 to the stationary plate 2. Any two opposite articulation points 12 of the four articulation points, in which two outer wall elements 4 are connected, are used as securing points 6a, 6b for securing the grid 5 to the rotatable plate 3.

In the installed state, the wall elements 4 form together with the plates 2 and 3 the working chambers 11a, 11b, 11c, and 11d. In the configuration of the grid 5 shown in FIG. 1, the working chambers 11a and 11c have their maximum volume, whilst the working chambers 11b and 11d have their minimum volume.

When the plate 3 is rotated about its axis 8 in the direction of the arrow, the arrangement of the wall elements 4 with respect to each other changes. On rotation with respect to the position shown in FIG. 1, the wall elements 4 assume the configuration shown in FIG. 4. In this position, all the chambers 11a, 11b, 11c and 11d have the same volume. After a further rotation in the direction of the arrow (rotation through 90° with respect to the position shown in FIG. 1), the chambers 11b and 11d assume their maximum volume whilst the working chambers 11a and 11c assume their minimum volume. The configuration again corresponds in this case to that shown in FIG. 1 but with the difference that the securing points 6a, 6b have moved on a quarter circle. On further rotation, the volume of the chambers 11a and 11c again increases, and the volume of the chambers 11b and 11d again diminishes.

Figure 3:
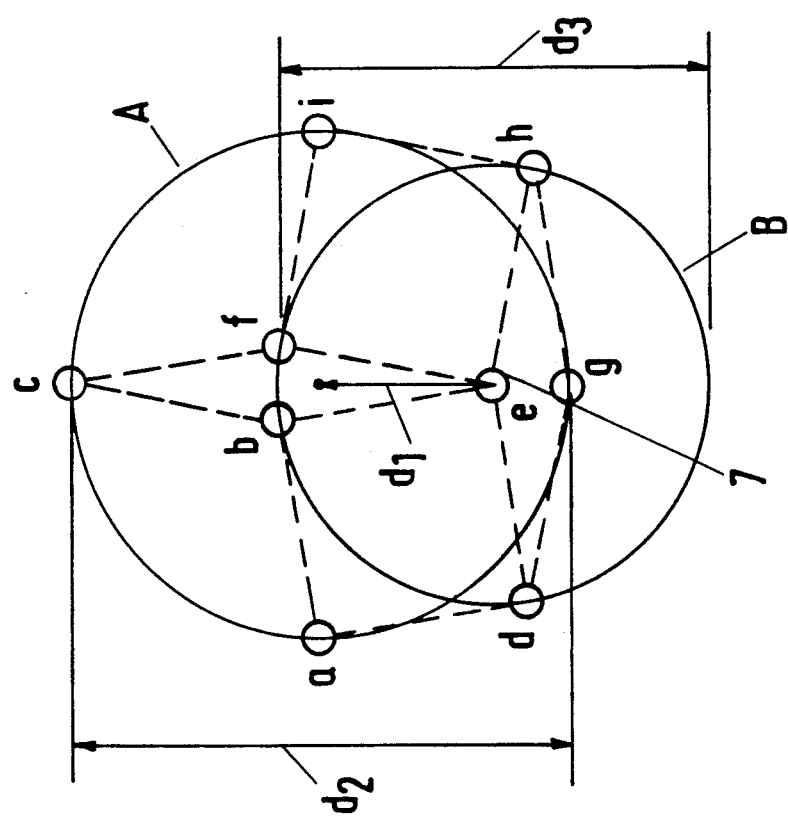
FIG. 3 is an illustration of the movement of the articulation points of the grid illustrated.

In FIG. 3, the grid is shown in the position illustrated in FIG. 1, and the circular paths of the articulation members illustrated. The articulation portions 17 are denoted with the letter a-i. The articulation portions in the points b, f, h and d move along the circular path B, and the corner points a, c, i and g move along the circular path A. 7 again denotes the securing point of the grid to the stationary plate 2. The diameter $d_3$ of the circle B corresponds to twice the length L of the wall element 4 (cf. FIG. 7a). The diameter $d_2$ and the spacing $d_1$ are likewise shown in FIG. 3, and are described by the aforementioned formula. The radius R contained therein is likewise shown in FIG. 7a.

Figure 5A:
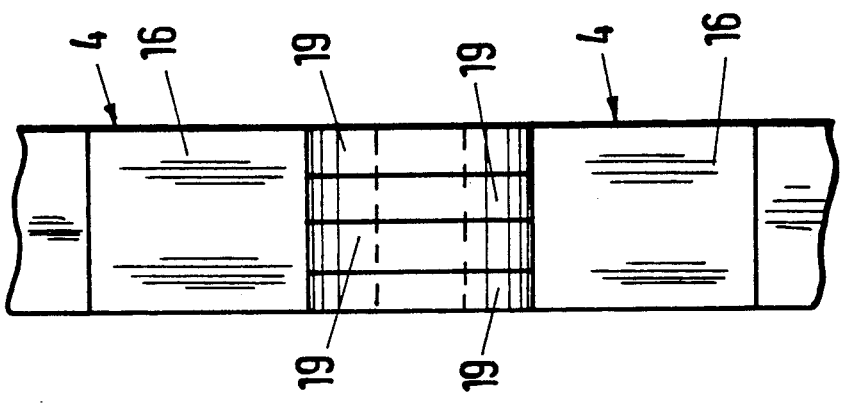
FIGS. 5a, b show the plan view and side view, respectively, of two interconnected wall elements.
Figure 5B:
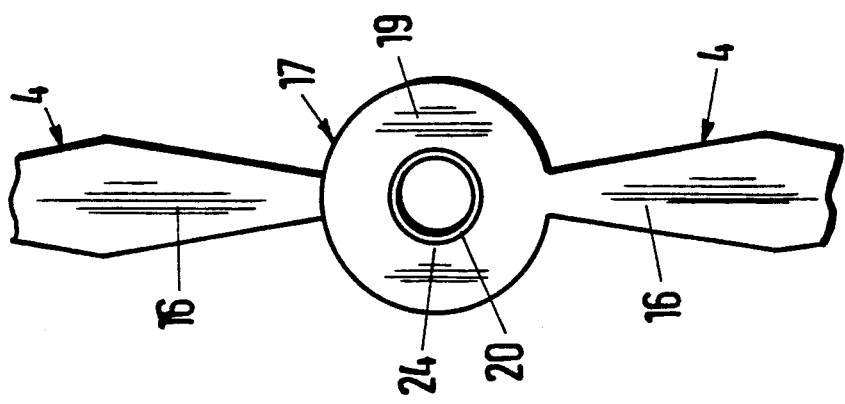

In FIG. 5a and 5b, two interconnected wall elements 4 are shown. Integrally formed on the centre portions 16 (cf. FIG. 5b) rhomboidal in side elevation are the articulation portions 17 which consist of a plurality of parallel spaced discs 19. The spacing of the discs 19 is chosen so that the discs of the one wall element 4 can engage into the intermediate spaces of the other wall element 4 and vice-versa. The articulation portions 17 are connected together and secured by a hinge sleeve 20 inserted into the central opening of the discs. The rhomboidal configuration of the central portions is necessary to ensure that adjacent wall elements can bear on each other with part of their wall surfaces so that the volume of the working chambers becomes as small as possible in the medium positions (e.g. working chamber 11b or 11d in FIG. 1).

Figure 6:
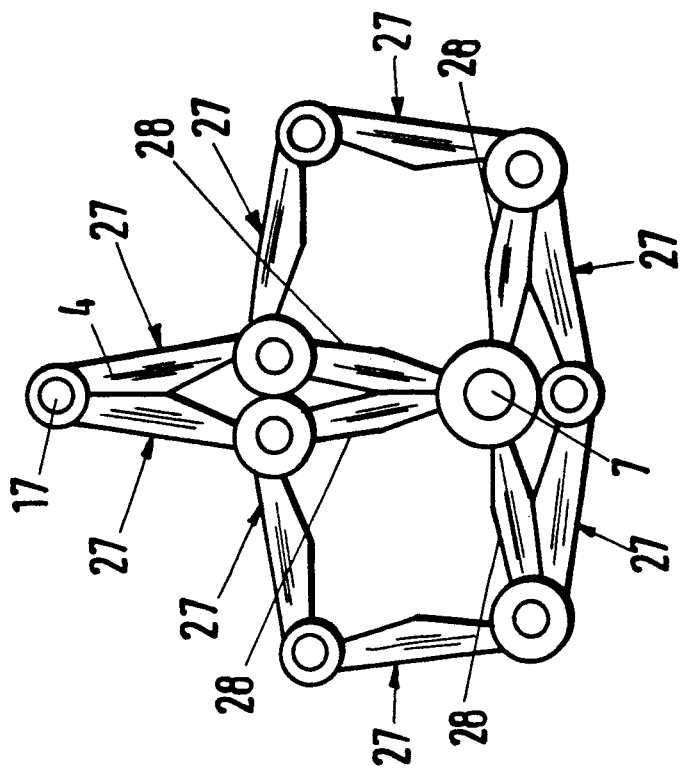
FIG. 6 is a view of the grid with wall elements according to a further embodiment.

In FIG. 6, the view of the grid 5 with wall elements 4 according to further embodiments is shown. The articulation portions 17 which are each connected to only one further articulation portion 17 have a smaller diameter than the articulation portions 17 which are connected to two further articulation portions 17. The articulation portions 17 which are arranged in the centre (in the centre point which is identical to the securing point 7) have the greatest diameter.

The eight outer wall elements 4 are made reinforced in the region of the articulation portions 17 in such a manner that the outer surfaces 27 of the wall elements 4 are formed substantially as planar surfaces. The four inner wall elements are also made reinforced or thickened in the regions 28.

Figure 7A:
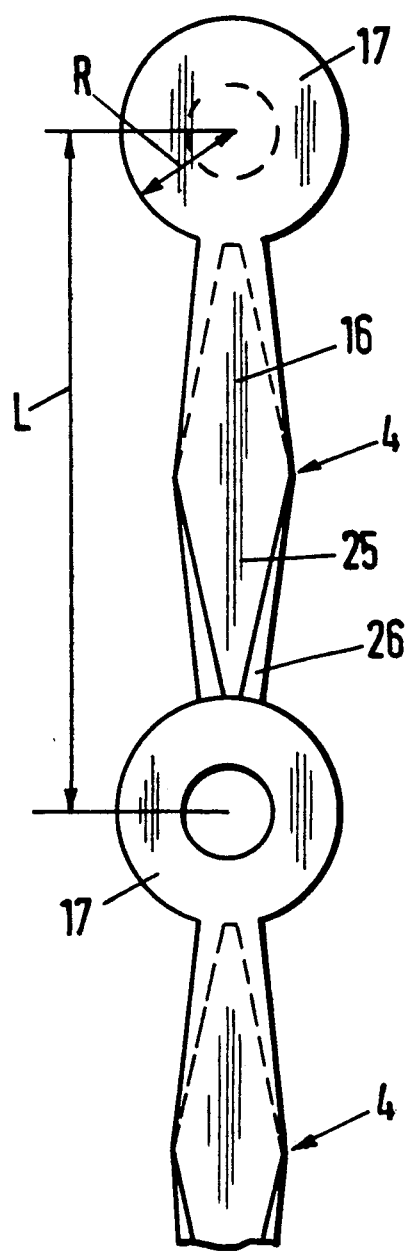
FIGS. 7a, b are a plan view and side view, respectively, of a wall element according to a further embodiment.
Figure 7B:
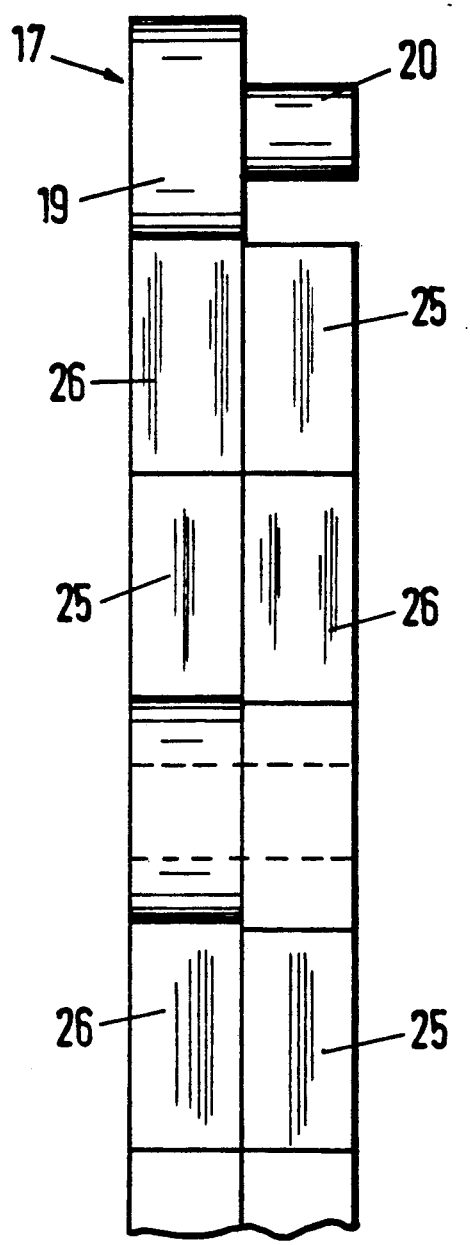

In FIGS. 7a and 7b, a further embodiment of two inter-connected wall elements 4 is shown. In the embodiment illustrated here, the centre portion 16 consists of two rhomboidal elements 25, 26 of which the elements 25 does not taper to a complete point at the articulation portions 17, thus forming a reinforcement.

In the embodiment of FIG. 7b, the upper articulation portion 17 consists of a single disc 19 on which the hinge pin 20 is integrally formed. As can be seen in FIG. 7b, the rhomboidal elements 25, 26 are divided and arranged offset with respect to each other. The lower wall element 4 is adapted with its rhomboidal elements 25, 26 to the form of the upper wall element.

Figure 4:
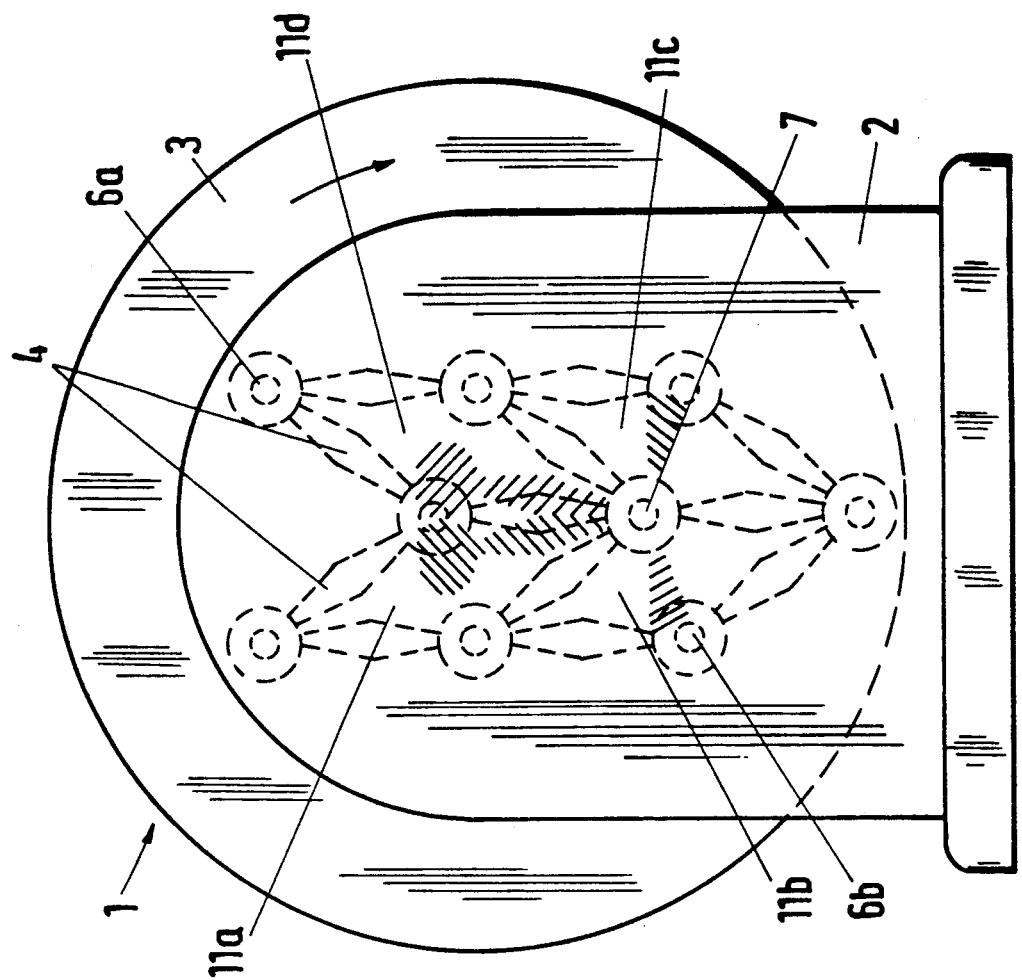
FIG. 4 shows a further view of the embodiment illustrated in FIG. 1, the rotatable plate being further turned compared with the position shown in FIG. 1.

When used as an internal-combustion engine, stationary plate 2 has inlet opening 13a for the supply of fuel and outlet opening 14a for the discharge of combustion gases, as shown in the hatched regions of FIGS. 1 and 4. As plate 3 rotates in a clockwise direction, ports 13a and 14a serve as inlet and outlet means simultaneously for all four chambers as the chambers 11 a, b, c, d move with respect to the ports. FIG. 10 shows the manipulations of wall elements 4, and demostrates, in particular, partial or complete blockage of inlet opening 13a during different work phases of the combustion-engion cycle. Thus the valves, camshafts, etc. of conventional engines may be dispensed with. Position 15 indicates an opening into which an ignition means (e.g., a spark plug) is inserted.

When the machine of the present invention is used as a pump, steam engine, or pressure driven machine, a corresponding set of inlet and outlet openings 13b and 14b are added, as shown in FIGS. 1, 4 and 10.

Thus the articulation portions have the form of cylinders of which the longitudinal axis lies perpendicularly to the rhomboidal face of the centre portions.

The articulation portions are formed by at least one circular disc which bears on at least one disc of a further wall element and cooperates with said disc. If in two adjacent wall elements the articulation portions each consist only of a disc, then the latter are arranged correspondingly, to offset.

The sum of the two disc thickness must correspond to the width of the wall elements so that the respective working chamber is closed sealingly outwardly.

If the articulation portions consist of a plurality of parallel, adjacently arranged spaced discs, the thickness and the spacing of the discs of the articulation portions to be connected may be so chosen that said portions engage, with each other in a form-locking manner. In this case as well, the sum of the disc thicknesses must correspond to the width of the wall elements.

According to one embodiment, all the discs may be provided in the articulation point with a central hole through which a hinge pin or a hinge sleeve is inserted, which holds the two articulation portions, and thus the wall elements, together rotatably. The hinge pin may also be integrally formed on a disc of an articulation portion, which then engages in a corresponding bore or opening of the disc of an adjacent wall element.

Depending on the arrangement of the grid or grating, it may also be necessary to connect more than two articulation portions together. Account is taken of this in that the number, width, and spacing of the discs are appropriately matched. The decisive point is that over the entire width of the wall element, discs are arranged so that after the installation between the plates the chambers are completely sealed from the outside in gas-tight and pressure-tight manner. For this purpose, it is further necessary for the discs of the joint portions to be connected to engage in exact fit with each other.

Possibly, the disc faces may be provided with a sliding layer which simultaneously performs a sealing function.

The plates and the longitudinal sides of the centre portions which bear on the plates and slide on said plates must also have been machined planarly so that the working chambers are sealed from the outside. For this purpose, these surfaces may additionally likewise be covered with a sliding layer which also simultaneously performs the sealing function.

Preferably, the centre portions of the outer wall elements are reinforced in the region of the articulation portions to better withstand the forces acting on the wall elements. The securing points between the grid and the plates are in each case articulation points of the wall elements.

According to a particular embodiment, the articulation portions disposed in the securing point of the stationary plate have a greater diameter than the remaining articulation portions The number of the wall elements depends on the desired number and form of the working chambers. Thus, it is possible with nine wall elements to construct a gridwork or grating which, after insertion between the plates, forms together with the latter three working chambers. With ten wall elements, a grid can be made up which forms two large-volume working chambers after installation between the plates. The preferred embodiment has twelve wall elements which are connected together in such a manner that four working chambers are available in the assembled machine.

Since all the wall elements have the same overall length, with twelve wall elements, which are connected with their joint portions, a grid having four rhomboidal chambers can be made, each pair of opposite chambers having the same shape.

In this grid there is a point (centre point) at which four wall elements are connected together, four points at which three wall elements are connected together, and four points at which two wall elements are connected together.

The wall elements connected in said centre point form the inner wall elements, and are connected at their respective other end to the outer wall elements. Between every two outer articulation points of two inner wall elements, two interconnected outer wall elements are connected.

The grid is secured with said centre point to the stationary plate and with two opposite points, in which only two outer wall elements are connected, to the rotatable plate.

For the spacing of said two securing points, the relationship $$d_2 = 2\sqrt{L^2 - R^2} + 2R$$

applies, wherein R is the radius of the articulation portions and L the spacing of two articulation points of a wall element.

For the distance of the securing point of the grid to the stationary plate from the rotational axis of the rotatable plate $$d_1 \leq \sqrt{L^2 - R^2} - R$$

holds true.

Since in the centre point and at the corner points in each case articulation portions with hinge sleeves or bushes are disposed, the securing can be effected in a simple manner in that in the articulation sleeves pins are inserted which are fixedly connected to the plates.

The axis of rotation of the rotatable plate is disposed in the centre between the two securing points of the grid to said plate and spaced from the centre of the grid or form the securing point of the grid to the stationary plate. The axis of rotation lies parallel to the articulation axes (the longitudinal axis of the articulation portions) of all wall elements. If after the assembly the rotatable plate is turned about said axis of rotation, all the wall elements move slidingly in a respectively different manner over the contact surfaces of the plates and as a result the volumes of the working chambers are varied between minimum and maximum. The ratio of the minimum to the maximum volume of a working chamber can be up to 1:10 and more. During one revolution, each working chamber assumes its maximum volume twice. When two oppositely disposed chambers assume their minimum volume, the other two working chambers assume their maximum volume.

During the rotation of the rotatable plate, due to the aforementioned arrangement, the securing points of the rotatable plate move on a circle which is eccentrically disposed with respect to the centre point, which is identical to the securing point of the stationary plate. The two other outer articulation points of the rhomboidal grid in which only two outer wall elements are connected also move along the same circular path.

The advantage of said machine resides, inter alia, in that the centre of gravity of the grid does not change its position during the rotation, and always lies betweem the axis of rotation of the rotatable plate and the securing point of the stationary plate. The centre of gravity of the four inner wall elements and the centre of gravity of the remaining eight outer wall elements is also stationary but is not identical. As a result, the inner and outer wall elements can have a different shape, and the centre of gravity of the grid can thereby be displaced in turn in a desired manner. The advantage of the machine or engine according to the invention resides in that it is distinguished by extremely silent running. Due to the large contact area between the wall elements and the two plates, the frictional combustion heat can be dissipated in simple manner by cooling the plate.

If the machine is to be used as an internal-combustion engine, then in the stationary plate an inlet opening is formed which is configured for supplying fuel, which may be liquid or gaseous, into the respective working chamber. Futhermore, in the stationary plate an outlet opening is provided which is formed for discharge of the exhaust gases from the working chamber. The engine likewise comprises in the stationary plate an ignition means, for example a sparkplug, with which the fuel can be ignited after it has been compressed. The expert dealing with the development of internal-combustion engines knows at which point the inlet and outlet openings and the ignition means are to be arranged.

If the machine is to be used as a, diesel engine, one or more openings for the injection of the diesel fuel are necessary in the stationary plate.

The shaft secured to the rotatable plate is made in this use as a drive shaft for the wheels of a motor vehicle.

For the field of use of the internal-combustion engine, in the stationary plate 2 the inlet opening 13a for the supply of the fuel and the outlet opening 14a for the discharge of the combustion gases are shown hatched (cf. FIG. 1). It is possible both for the entire hatched region to be used as inlet or outlet opening or only an area segment. The position 15 indicates the opening into which the ignition means, for example a sparkplug, is inserted.

It is also possible to provide the inlet opening in the region 13b and the outlet opening in the region 14b. It has however been found that the region 13a and 14a are more favorable.

When the machine 1 according to the invention is used as a pump, steam engine, or pressure-driven machine, both end openings 13a and 13b and both outlet openings 14a and 14bare used.

Figure 8:
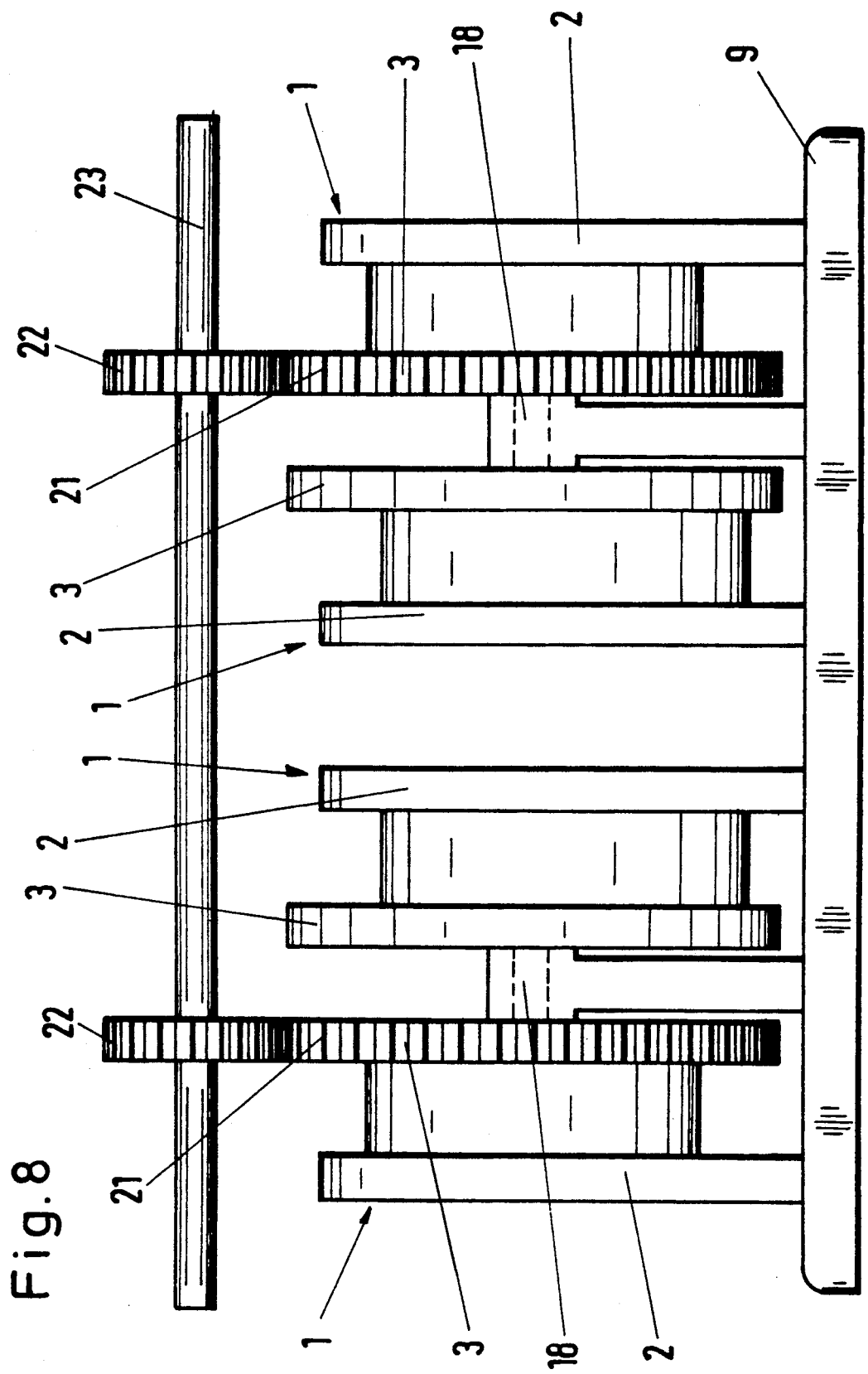
FIG. 8 shows the arrangement of four internal-combustion engines to provide a drive aggregate.

In FIG. 8, a plurality of internal-combustion engines 1 according to the invention are assembled in pairs to form an engine. In each case, two rotatable plates 3 are connected to a shaft 18. Via gears 22 engaging directly on the rotatable plates 3, which in their outer contour are likewise formed as gears 21, a common shaft 23 can be driven. The engines connected in pairs are phase-displaced by 45° to obtain a smoother running condition.

Figure 9:
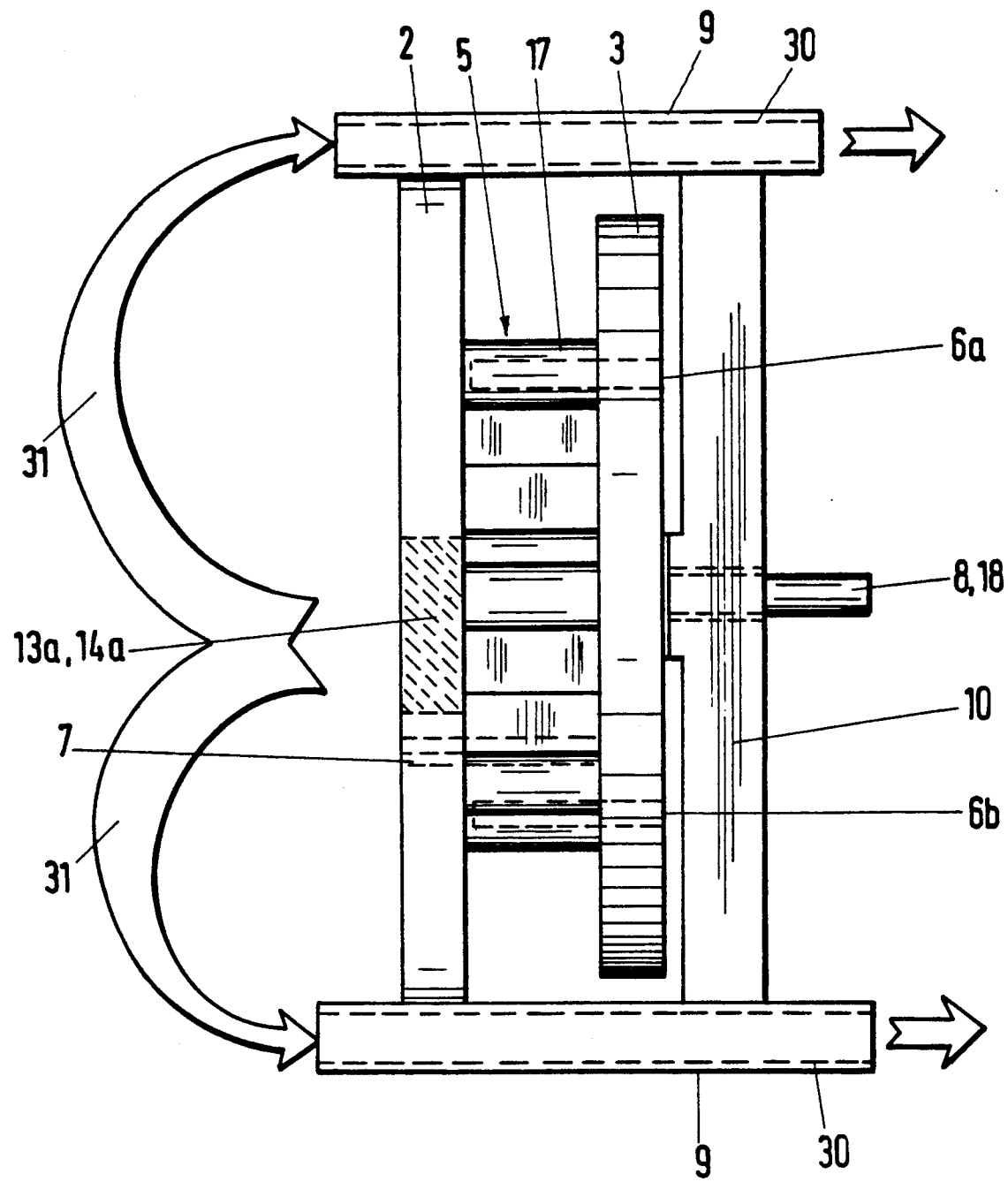
FIG. 9 is a side view of the machine according to a further embodiment.

FIG. 9 shows the side elevation of yet another embodiment of the machine. In addition to the lower base plate 9, a further upper spacing plate 9 is provided, the two plates being provided with conduits 30 through which in operation as an internal-combustion engine the hot exhaust gases from the outlet 14b are led off. This is shown in FIG. 9 by the arrows 31. The hot exhaust gases effect a length expansion of the plates 9 so that the spacing between the plates 2, 3 is adpated to the expansion of the wall elements 4.

Yet another embodiment of the invention is shown in FIG. 11. Plate 2 and holder 10 are connected by tubes 30, each of them comprising two telescoping parts. On the external surfaces are screw threads which mate with each other. Using sleeve 32 to rotate tubes 30, the distance between plate 2 and holder 10 may be adjusted manually. Moreover, coils 33 may be placed around tubes 30, and a current passed through these coils to produce heat and a magnetic field. The heat adjusts the distance between plate 2 and holder 10 by means of thermal expansion of the tubes. If the tubes are made of a magnetostrictive material (e.g., nickel), the magnetic field produced by coils 33 also may serve to adjust the distance between plate 2 and holder 10.

Such an engine equipped with four working chambers operates as so called four-stroke engine. Within one revolution of the rotatable plate each of the four chambers runs through all four strokes. Any desired number of these engines according to the invention may be arranged in compact manner adjacent each other to give a high-power engine.

To increase the compression, a further engine, for example operating by the principle of the Rolls-Royce Wankel engine, can be connected in series with the engine.

The motor differs from the conventional rotary piston engines in that the working chambers are not formed between a stationary housing and a piston rotating therein but instead directly between the wall elements so that a housing with a complicated interior configuration is completely dispensed with. Due to the fact that the inlet and outlet ports or openings are opened and closed by the side faces of the wall elements during their rotation, valves as required in conventional engines can be dispensed with. A crankshaft is also not necessary because the shaft secured to the rotatable plate can be used as output shaft, and thus as a drive shaft, for example, for a motor vehicle.

The absence of a housing futhermore affords the possibility of keeping the spacing between the stationary plate and the rotatable plate variable. By increasing the spacing of the two plates and using wider wall elements, an engine can be converted in a simple manner to an engine with larger working chambers.

In addition, in operation of the engine, the spacing of the plates can be set optimally for any operating state. The heating of the wall elements is accompanied by a length and width expansion of said wall elements which makes adaptation of the plate spacing necessary. Because of this possibility, the contact surfaces moved against each other can be made of high surface quality in the production itself.

According to one embodiment, supply conduits from the exhaust gas outlet to the base plate or a corresponding other or further space mounting of the two plates is provided so that said plates are heated in the same manner and expand like the wall elements.

According to a further embodiment, the base plate is made two-part or multi-part, and the space inbetween the plates is specifically set via known adjusting elements. It is possible in this manner to optimize the external pressure on the wall elements so that firstly the friction between the wall elements and the plates is as small as possible and secondly the working chambers are still sealed tightly. This specific adjustment of the plate spacing can also be achieved in that the base plate or another corresponding spacing means of the two plates is provided with a heating means.

According to a further embodiment, the base plate is made from such a material and in such a manner that the specific expansion on the plate can be brought about in a known manner by electrostriction or magnetostriction.

Because of the disc-shaped outer configuration of the machine, it is also possible to integrate the machine as an engine directly into the drive wheels.

The machine according to the invention can also be used as a pump for gaseous and liquid media. For this purpose, the shaft which is secured to the rotatable plate is formed as a drive shaft which is connected to an outside drive. In such uses in the stationary plate, four openings are disposed on a circle, two openings, being formed as inlet openings and two openings as outlet openings for the medium to be pumped.

The engine or the pump can be operated in two directions or reversed.

Apart from the use as an internal-combustion engine (Otto engine or diesel engine), the machine can be used as a steam engine or pressure-operated machine (with gases or liquids). In such uses in the stationary plate on a circle, four openings are formed, of which two openings are formed as inlet openings and two openings as outlet openings for the medium to be driven. The machine is not restricted to the uses outlined but can be employed universally.

What is claimed is:

1. An apparatus comprising at least two working chambers with variable volume and at least one inlet opening and one outlet opening for gaseous or liquid media, comprising:
   a first stationary plate and a second plate which is arranged parallel to the first plate spaced therefrom, and which is rotatably mounted via its central axis with respect to the first plate;
   a plurality of elongated wall elements which are disposed between said plates, and which bear slidingly and sealingly on said plates and together with the plates from the working chambers, each wall element being articulately sealingly connected at its end points (articulation points) to at least one further wall element in such a manner that said wall elements form a movable grid which is rotatably secured with respect to at least one point on the first plate and with respect to at least two points on the second plate in such a manner that upon rotation of the second plate the working chambers alternately assume their minimum and maximum volume; and
   a shaft mounted in the axis of rotation of the second plate.

2. An apparatus according to claim 1, wherein at least one inlet opening and at least one outlet opening are formed in the first plate for cooperation with the reciprocating working chambers.

3. An apparatus according to claim 1, wherein all the wall elements have the same overall length.

4. An apparatus according to claim 1, wherein the wall elements are dumbbell shaped, and consist of an elongated center portion at each of the two ends to which an articulation portion is integrally formed.

5. An apparatus according to claim 4, wherein said center portion is made rectangular in side elevation and rhomboidal in plan elevation.

6. An apparatus according to claim 4, wherein said center portion consists of at least two rhomboidal elements with different elements with different angles.

7. An apparatus according to claim 4, wherein the center portion of the wall elements lying on the outside of the grid are reinforced in the region of the articulation portions.

8. An apparatus according to claim 4, wherein said articulation portion has a cylindrical form, and consists of at least one disc which is constructed and arranged in such a manner that it bears in form-locking manner on at least one disc of the articulation portion/portions of one or more adjacent wall elements so that the respective working chamber is sealingly closed.

9. An apparatus according to claim 1, wherein the securing points are respective articulation points of the corresponding wall elements.

10. An apparatus according to claim 9, wherein the articulation portions disposed in the securing point to the first plate have a greater diameter than the remaining articulation portions.

11. An apparatus according to claim 8, wherein at least one disc of the articulation portions has a central opening through which a hinge pin or a hinge sleeve can be inserted.

12. An apparatus according to claim 11, wherein said hinge pin is integrally formed on one of the discs.

13. An apparatus according to claim 1, wherein the spacing of the axis from the securing point to the first plate is smaller than the spacing of the two articulation points of a wall element.

14. An apparatus according to claim 1, wherein twelve wall elements are assembled to form a grid in such a manner that four working chambers are formed.

15. An apparatus according to claim 14, wherein the securing points on the second plate are two oppositely disposed articulation points to which two outer wall elements are connected, and the securing point on the first plate is the articulation point at the interior of the grid to which four wall elements are connected.

16. An apparatus according to claim 14, wherein the grid is secured with said securing points to the plates in such a manner that upon rotation of the second plate, the securing points on the second plate orbit along a circle A eccentric with respect to the securing point on the first plate.

17. An apparatus according to claim 14, wherein the spacing $d_1$ of the rotation axis of the second plate from the securing point connected to the first plate is equal to or less than $$\sqrt{L^2 - R^{2'}} - R,$$

L being the spacing between two articulation points of a wall element and R being the radius of the articulation portions.

18. An apparatus according to claim 14, wherein the spacing $d_2$ of the securing points connected to the second plate is equal to $$2\sqrt{L^2 - R^2} + 2R.$$

19. An apparatus according to claim 1, wherein for operation as an internal-combustion engine the inlet opening is formed for introduction of fuel, and the outlet opening is formed for ejection of exhaust gas, an ignition means for igniting the fuel is provided in the first plate, and the shaft on the second plate is formed as an output shaft.

20. An apparatus according to claim 1, wherein for operation as a pump the inlet openings are formed for introduction of the medium to be pumped, and the outlet openings are formed for discharge of the medium to be pumped, and the shaft on the second plate is formed for driving of the machine.

21. An apparatus according to claim 1, wherein for operation as steam engine or pressure-driven machine the inlet openings are formed for introduction of the medium driving the machine, and the outlet openings are formed for discharge of the driving medium, and the shaft on the second plate is formed as an output shaft.

22. An apparatus according to claim 1, wherein the inlet openings and the outlet openings are sealable by the wall elements.

23. An apparatus according to claim 1, wherein means are provided with which the spacing between the plates can be differentially adjusted.

24. An apparatus according to claim 23, wherein the base plate is formed in such a manner that the length thereof is adjustable by electrostriction or magnetstriction.

25. An apparatus according to claim 23, wherein the base plate is made in two parts, and adjusting means are provided to move the plate parts relatively to each other.

26. An apparatus according to claim 23, wherein the base plate is provided with a heating means in such a manner that the length of the base plate is adjustable.

27. An apparatus according to claim 23, wherein when operated as an engine the hot waste gases can be removed through the base plate in such a manner that said plate changes its length.

* * * * *